3,772,337
2-ACETAL-7-KETAL-5-NORBORNENE AND 2-ACETAL-7-KETALNORBORNANE COMPOUNDS

Frederick Lynn Hamb, Rochester, N.Y., assignor to Eastman Kodak Company, Rochester, N.Y.
No Drawing. Original application Oct. 4, 1968, Ser. No. 765,036. Divided and this application May 13, 1971, Ser. No. 143,273
Int. Cl. C07d 13/04
U.S. Cl. 260—340.9       4 Claims

ABSTRACT OF THE DISCLOSURE 2-acetal-7-ketal-5-norbornene compounds, such as 2-(1,3 - dioxolan - 2 - yl) - 3 - methyl - 7,7 - dimethoxy - 5-norbornene, and the corresponding norbornane compounds, for example, 2-(1,3-dioxolan-2-yl)-3-methyl-7,7-dimethoxynorbornane, are central nervous system depressants; and in addition, the norbornene compounds exhibit anticonvulsant activity. These compounds are synthesized from 1,2,3,4-tetrachloro-5-ketalcyclopentadienes and $\alpha,\beta$-unsaturated aldehydes in a plural step synthesis comprising (1) a Diels-Alder addition, (2) acetalization (3) dechlorination and, in the case of the norbornane compounds, (4) hydrogenation, as is illustrated by the following equations:

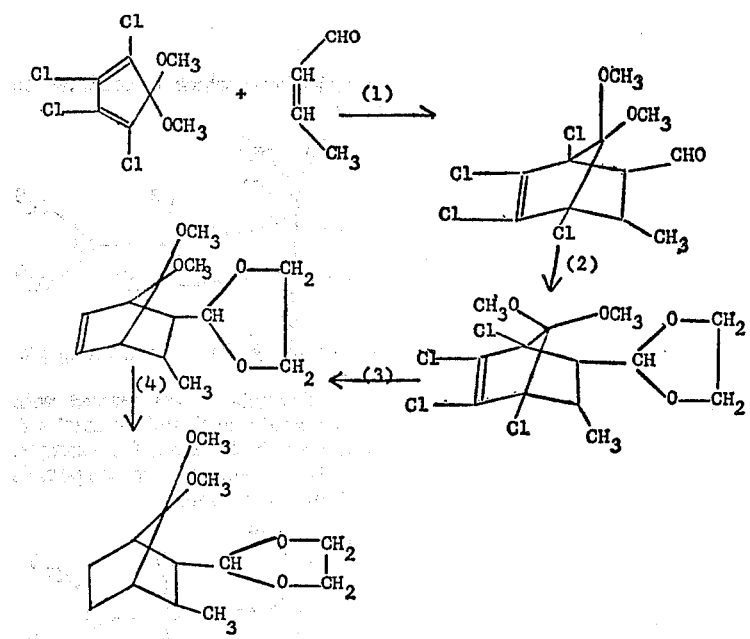

This application is a division of our copending U.S. patent application Ser. No. 765,036, filed Oct. 4, 1968 now U.S. Pat. 3,625,977.

This invention relates to novel 2-acetal-7-ketal-5-norbornene and 2-acetal-7-ketalnorbornane compounds having useful pharmacological activity. These compounds may be represented by the general formula:

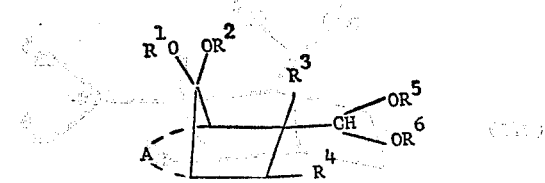

wherein each of $R^1$, $R^2$, $R^5$ and $R^6$ individually represents a lower alkyl group, each of $R^3$ and $R^4$ represents hydrogen or a lower alkyl group, wherein $R^1$ and $R^2$ when taken collectively represent an unsubstituted polymethylene radical having 2 to 4 carbon atoms or a polymethylene radical having 2 to 4 carbon atoms which is substituted with a lower alkyl group or a lower alkoxyalkyl group, wherein $R^5$ and $R^6$ when taken collectively represent an unsubstituted polymethylene radical having 2 to 4 carbon atoms or a polymethylene radical having 2 to 4 carbon atoms which is substituted with a lower alkyl group or a lower alkoxyalkyl group and A represents an ethylene radical or a vinylene radical.

By the term "lower alkyl group" is meant an alkyl group having 1 to 6 carbon atoms, whether branched or straight chain, such as methyl, ethyl, propyl, isopropyl, butyl, tertbutyl, pentyl and hexyl, for example.

By the term "lower alkoxyalkyl group" is meant an alkoxyalkyl group having 2 to 6 carbon atoms, whether branched or straight chain, such as methoxymethyl, 2-methoxyethyl, 2-ethoxyethyl, 2-propoxyethyl, 2-butoxyethyl, 3-propoxypropyl, 3-isopropoxypropyl and 2-isopropoxypropyl, for example.

Preferred alkyl and alkoxyalkyl groups are straight chain groups, with the methyl and methoxymethyl groups being particularly preferred. The polymethylene groups represented by $R^1$ and $R^2$, collectively, and $R^5$ and $R^6$, collectively, are preferably unsubstituted. Preferably, $R^1$ and $R^2$, individually, are the same lower alkyl group.

Similarly, $R^5$ and $R^6$, individually, preferably are the same lower alkyl group.

Illustrative of the compounds having the Formula I are:

2-(dimethoxymethyl)-7,7-dimethoxy-5-norbornene,
2-(dimethoxymethyl-7,7-diethoxy-5-norbornene,
2-(dimethoxymethyl)-7,7-dihexoxy-5-norbornene,
2-(dihexoxymethyl)-7,7-dimethoxy-5-norbornene,
2-(dihexoxymethyl)-7,7-dihexoxy-5-norbornene,
2-(dimethoxymethyl)-2-methyl-7,7-dimethoxy-5-norbornene
2-(dimethoxymethyl)-2-hexyl-7,7-dimethoxy-5-norbornene,
2-(dimethoxymethyl)-3-hexyl-7,7-dimethoxy-5-norbornene,
2-(2-dioxolanyl)-7,7-dimethoxy-5-norbornene,
2-(2-dioxolanyl)-7,7-ethylenedioxy-5-norbornene,
2-[2-(1,3-dioxepanyl)]-7,7-tetramethylenedioxy-5-norbornene, 2-(dimethoxymethyl)-7,7-dimethoxynorbornane,
2-(dimethoxymethyl)-7,7-diethoxynorbornane,
2-(dimethoxymethyl)-7,7-dihexoxynorbornane,
2-(dihexoxymethyl)-7,7-dimethoxynorbornane,
2-(dihexoxymethyl)-7,7-dihexoxynorbornane,
2-(dimethoxymethyl)-2-methyl-7,7-dimethoxynorbornane,
2-(dimethoxymethyl)-2-hexyl-7,7-dimethoxynorbornane,
2-(dimethoxymethyl)-3-hexyl-7,7-dimethoxynorbornane,
2-(2-dioxolanyl)-7,7-dimethoxynorbornane,
2-(2-dioxolanyl)-7,7-ethylenedioxynorbornane, and
2-[2-(1,3-dioxepanyl)]-7,7-tetramethylenedioxynorbornane, for example.

The compounds of this invention are readily obtained by a plural step synthesis from known starting materials, viz, 1,2,3,4-tetrachloro - 5 - ketalcyclopentadienes, α,β-unsaturated aldehydes and monohydric or dihydric alcohols.

The first step of this synthesis comprises a Diels-Alder addition of a 1,2,3,4-tetrachloro-5-ketalcyclopentadiene with an α,β-unsaturated aldehyde, as illustrated by the equation:

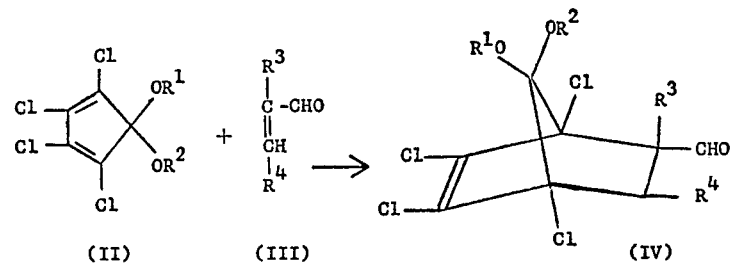

(II)　(III)　(IV)

wherein $R^1$, $R^2$, $R^3$ and $R^4$ have the meaning previously assigned to them.

Illustrative 1,2,3,4 - tetrachloro-5-ketalcyclopentadienes which can be obtained by reacting hexachlorocyclopentadiene with an alkali metal alkoxide or with an alcohol in the presence of an alkali metal hydroxide include:

1,2,3,4-tetrachloro-5,5-dimethoxycyclopentadiene,
1,2,3,4-tetrachloro-5,5-diethoxycyclopentadiene,
1,2,3,4-tetrachloro-5,5-dipropoxycyclopentadiene,
1,2,3,4-tetrachloro-5,5-diisopropoxycyclopentadiene,
1,2,3,4-tetrachloro-5,5-dibutoxycyclopentadiene,
1,2,3,4-tetrachloro-5,5-dipentoxycyclopentadiene,
1,2,3,4-tetrachloro-5,5-dihexoxycyclopentadiene,
1,2,3,4-tetrachloro-5,5-ethylenedioxycyclopentadiene,
1,2,3,4-tetrachloro-5,5-isopropylenedioxycyclopentadiene,
1,2,3,4-tetrachloro-5,5-tetramethylenedioxycyclopentadiene and the like.

Illustrative α,β-unsaturated aldehydes include acrolein, methacrolein, ethacrolein, crotonaldehyde, 2-methylbuten-2-al, 2-pentenal, 2-methylpenten-2-al, 2-hexenal, and the like.

The reaction conditions of the Diels-Alder addition reaction are not critical, but normally the 1,2,3,4-tetrachloro-5-ketalcyclopentadiene and the α,β-unsaturated aldehye are charged to a suitable reaction vessel in approximately equimolar amounts and heated at elevated temperature, generally from about 50° to about 150° C. Temperatures above 100° C. are ordinarily preferred. The reaction can be carried out in the presence of an inert solvent, if desired, but ordinarily the use of a solvent is unnecessary. Solvents that can be employed include, for example, aromatic hydrocarbons (e.g., benzene, toluene and xylene), cycloaliphatic hydrocarbons (e.g., cyclohexane) or chlorinated hydrocarbons (e.g. chlorobenzene, $Cl_2CHCHCl_2$ and $ClCH_2CCl_3$). The solvents named are intended to be illustrative and not limitative of the invention. Other inert solvents having an appropriate boiling point could be used.

The aldehye product obtained from the Diels-Alder addition reaction is reacted with a monohydric or dihydric alcohol to convert the aldehyde to the corresponding acetal. Illustrative alcohols include, for example, methanol, ethanol, propanol, isopropanol, butanol, tertiary butanol, ethylene glycol, propylene glycol (1,2-propanediol), 1,3-propanediol, 1,4-butanediol, 3-methoxy-1,2-propanediol and monoacetin.

The ratio of alcohol to aldehye is not critical, although a ratio of 2 equivalents of alcohol to one equivalent of aldehyde, i.e., 2 moles of a monohydric alcohol or 1 mole of a dihydric alcohol per mole of aldehyde, is normally employed.

This reaction (acetalization) is catalyzed by acid, such as organic carboxylic or sulfonic acids or mineral acids. Preferred are the organic sulfonic acids such as benzenesulfonic acid, p-toluenesulfonic acid and the like.

To ensure carrying the reaction to completion, the water formed should be continuously removed. This can be effected in any suitable manner. A convenient technique comprises conducting the reaction under reflux in the presence of a solvent, such as benzene, which forms a minimum boiling azeotrope with water, while separating water from the distillate.

The tetrachloro-2-acetal-7-ketal which is produced in this step has the formula:

(V) 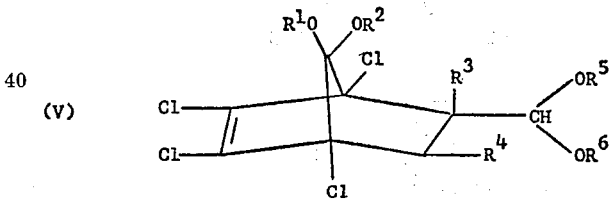

wherein $R^1$, $R^2$, $R^3$, $R^4$, $R^5$ and $R^6$ have the meaning previously assigned to them.

The ketals having the Formula V are reacted with sodium in the presence of tert-butanol and an inert solvent such as dioxane and tetrahydrofuran, for example, to produce the 2-acetal-7-ketals-5-norbornene compounds of this invention which have the formula:

(VI) 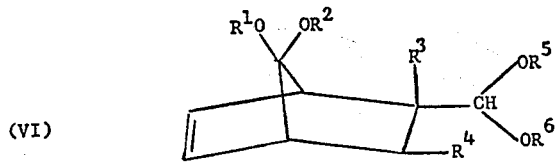

wherein $R^1$, $R^2$, $R^3$, $R^4$, $R^5$ and $R^6$ have the meaning previously assigned to them.

The reaction is normally effected at elevated temperature, with reflux temperatures being convenient.

The norbornane compounds of the invention and which have the formula:

(VII) 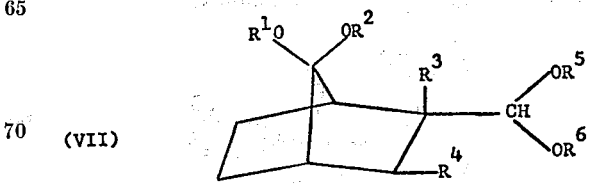

wherein $R^1$, $R^2$, $R^3$, $R^4$, $R^5$ and $R^6$ have the meaning previously assigned to them are prepared by hydrogenating the norbornene compounds having the Formula VI.

The hydrogenation is generally effected at moderately elevated pressures, e.g. about 25 to 100 p.s.i., and autogeneous temperatures over a suitable catalyst. Particularly preferred catalysts are the noble metal oxides such as platinum or palladium oxide, although other catalysts such as Raney nickel and the like may be employed. The hydrogenation is desirably effected in the presence of an inert solvent, especially a lower alkanol such as methanol, ethanol, propanol, isopropanol, butanol and the like.

The norbornene and norbornane compounds of this invention are central nervous system depressants, and in addition, the norbornene compounds exhibit anticonvulsant activity. When employed for these purposes, the compound is administered to a mammal in an effective amount. The actual amount is not critical, and will vary with the subject and the dosage necessary in a particular case. In general, however, effective amounts as depressants and anticonvulsants are in the range of from about 10 to 500 milligrams per kilogram of mammal body weight, although higher and lower dosage levels may be employed if desired.

The mode of administration is not critical, and the compound may be administered by enteric or parenteral methods. The form of the compound is likewise not critical, and it may be in the form of tablets, capsules, oral or injectable solutions or suspensions, suppositories and the like, containing the compound, in admixture with pharmaceutically acceptable excipients.

The following examples are illustrative. Infrared spectra of the products were consistent with their assigned structures.

EXAMPLE 1

105 grams of crotonaldehyde were added to 396 grams of 1,2,3,4-tetrachloro-5,5 - dimethoxycyclopentadiene and the resulting solution was gently refluxed for 24 hours. On rectification of the resulting viscous reaction mixture 320 grams (64% yield) of 1,4,5,6-tetrachloro - 2 - formyl-3-methyl-7,7-dimethoxy-5-norbornene boiling at 100° C./0.01 mm. and having an index of refraction, $n_D^{25}$ of 1.5270 were obtained. The 2,4-dinitrophenylhydrazone derivative was prepared and melted at 158–160° C.

Calculated for $C_{17}H_{16}Cl_4N_4O_6$ (percent): C, 39.7; H, 3.1; Cl, 27.6; N, 10.9. Found (percent): 39.5; H, 2.9; Cl, 27.6; N, 10.8.

EXAMPLE 2

Employing procedures similar to those described in Example 1, except that acrolein was substituted for crotonaldehyde, there was obtained an 87% yield of 1,4,5,6-tetrachloro-2-formyl-7,7-dimethoxy - 5 - norbornene, B.P. 113° C./0.25 mm.; $n_D^{25}$=1.5296.

EXAMPLE 3

Employing procedures similar to those described in Example 1, except that methacrolein was substituted for crotonaldehyde, there was obtained a 57% yield of 1,4,5,6-tetrachloro-2-formyl-2-methyl-7,7-dimethoxy - 5 - norbornene, B.P. 111° C./0.009 mm.; $n_D^{25}$=1.5260. Its 2,4-dinitrophenylhydrazone derivative melted at 156–158° C.

Calculated for $C_{17}H_{16}Cl_4N_4O_6$ (percent): C, 39.7; H, 3.1; Cl, 27.6; N, 10.9. Found (percent): C, 40.0; H, 3.4; Cl, 27.4; N, 10.6.

EXAMPLE 4

Employing procedures similar to those described in Example 1, except that 1,2,3,4-tetrachloro-5,5-ethylenedioxycyclopentadiene was substituted for the tertachlorodimethoxycyclopentadiene, there was obtained a 53% yield of 1,4,5,6-tetrachloro-2-formyl-3 - methyl - 7,7 - ethylenedioxy-5-norbornene, B.P. 147° C./0.003 mm.; $n_D^{25}$, 1.5372. Its 2,4-dinitrophenylhydrazone derivative melted at 227–230° C.

Calculated for $C_{17}H_{14}Cl_4N_4O_6$ (percent): C, 39.9; H, 2.8; Cl, 27.7; N, 10.9. Found (percent): C, 40.0; H, 2.6; Cl, 28.0; N, 10.6.

EXAMPLE 5

Employing procedures similar to those described in Example 1, except that 1,2,3,4-tetrachloro-5,5-dibutoxycyclopentadiene was substituted for the tetrachlorodimethoxycyclopentadiene, there was obtained a 30% yield of 1,4,5,6-tetrachloro-2-formyl-3-methyl - 7,7 - dibutoxy - 5-norbornene, B.P. 155°/0.01 mm.; $n_D^{25}$, 1.5096.

EXAMPLE 6

A solution of 237 grams of the aldehyde of Example 1 in 600 milliliters of benzene was admixed with 44 grams of ethylene glycol and 2 grams of p-toluenesulfonic acid. The resulting solution was refluxed for 18 hours, during which time the water formed was separated by a Dean-Stark trap. After the addition of 1 gram of sodium ethoxide, the solution was washed twice using a 200-milliliter portion of water each time, then dried over magnesium sulfate and evaporated to give a thick viscous oil. On distillation there was obtained 207 grams (79% yield) of 1,4,5,6-tetrachloro-2-(2-dioxolanyl)-3-methyl - 7,7 - dimethoxy-5-norbornene, B.P. 81° C./0.002 mm.; $n_D^{25}$, 1.5292.

Calculated for $C_{13}H_{16}Cl_4O_4$ (percent): C, 41.3; H, 4.3; Cl, 37.5. Found (percent): C, 41.0; H, 4.1; Cl, 37.8.

EXAMPLE 7

Employing procedures similar to those described in Example 6, except that 1,3-propanediol was substituted for the ethylene glycol, there was obtained a 69% yield of 1,4,5,6-tetrachloro-[2 - (1,3 - dioxanyl)] - 3 - methyl-7,7-dimethoxy - 5 - norbornene, B.P. 85° C./0.002 mm., $n_D^{25}$ 1.5250.

Calculated for $C_{14}H_{18}Cl_4O_4$ (percent): C, 42.9; H, 4.6; Cl, 36.2. Found (percent): C, 42.9; H, 4.7; Cl, 36.6.

EXAMPLE 8

Employing procedures similar to those described in Example 6, except that 1,2-dihydroxy-3-methoxypropane was substituted for the ethylene glycol, there was obtained a 78% yield of 1,4,5,6-tetrachloro - 2 - [2 - (4' - methoxymethyldioxolanyl)]-3-methyl - 7,7 - dimethoxy - 5 - norbornene, B.P. 97° C./0.001 mm.; $n_D^{25}$, 1.5174.

Calculated for $C_{15}H_{20}Cl_4O_5$ (percent): C, 42.7; H, 4.8; Cl, 33.6. Found (percent): C, 42.6; H, 5.1; Cl, 33.9.

EXAMPLE 9

Employing procedures similar to those described in Example 6, except that the product of Example 2 was substituted for that of Example 1, there was obtained a 77% yield of 1,4,5,6-tetrachloro-2-(2 - dioxolanyl) - 7,7-dimethoxy-5-norbornene, B.P. 80° C./0.002 mm.; $n_D^{25}$, 1.5295.

Calculated for $C_{12}H_{14}Cl_4O_4$ (percent): C, 39.6; H, 3.9; Cl, 39.0. Found (percent): C, 39.3; H, 3.6; Cl, 39.2.

EXAMPLE 10

Employing procedures similar to those described in Example 6, except that the product of Example 3 was substituted for that of Example 1, there was obtained a 79% yield of 1,4,5,6-tetraachloro - 2 - (2-dioxolanyl)-2-methyl-7,7-dimethoxy-5-norbornene, B.P. 88° C./0.004 mm.; $n_D^{25}$, 1.5300.

Calculated for $C_{13}H_{16}Cl_4O_4$ (percent): C, 41.3; H, 4.3, Cl, 37.5. Found (percent): C, 41.1; H, 4.2; Cl, 37.3.

EXAMPLE 11

Employing procedures similar to those described in Example 6, except that the product of Example 3 was substituted for that of Example 1 and methanol was substituted for the ethylene glycol, there was obtained 1,4,5,6-tetrachloro-2-methyl - 2 - (dimethoxymethyl - 7,7 - dimethoxy-5-norbornene, B.P. 85° C./0.008 mm., M.P. 110–112° C. (from ethanol).

Calculated for $C_{13}H_{19}Cl_3O_4$ (percent): C, 41.2; H, 4.5; Cl, 37.4. Found (percent): C, 40.9; H, 4.8; Cl, 37.4.

EXAMPLE 12

Employing procedures similar to those described in Example 6, except that the product of Example 4 was substituted for that of Example 1, there was obtained a 79% yield of 1,4,5,6-tetrachloro - 2 - (2-dioxolanyl)-3-methyl - 7,7 - ethylenedioxy - 5 - norbornene, B.P. 90° C./0.003 mm.; $n_D^{25}$, 1.5370.

Calculated for $C_{13}H_{14}Cl_4O_4$ (percent): C, 41.5; H, 3.8; Cl, 37.7. Found (percent): C, 41.7; H, 3.7; Cl, 37.8.

EXAMPLE 13

Employing procedures similar to those described in Example 6, except that the product of Example 5 was substituted for that of Example 1, there was obtained a 44% yield of 1,4,5,6-tetrachloro - 2 - (2-dioxolanyl)-3-methyl - 7,7 - dibutoxy - 5 - norbornene, B.P. 89° C./0.001 mm.; $n_D^{25}$, 1.5088.

Calculated for $C_{19}H_{28}Cl_4O_4$ (percent): C, 49.4; H, 6.1; Cl, 30.7. Found (percent): C, 49.2; H, 6.2; Cl, 30.3.

EXAMPLE 14

To a solution of 113.4 grams of the product of Example 6 in 1,000 ml. of tetrahydrofuran and 266 grams of tert-butanol was added 100 grams of finely chopped sodium. The resulting mixture was stirred vigorously while gently refluxing in a nitrogen atmosphere for 7 hours. At the end of this time the excess sodium was eliminated by the cautious addition of 700 ml. of methanol. The reaction mixture was then poured into two liters of ice and extracted with four 500 ml. portions of ether. The combined ether extracts were washed twice using a 1,000 ml. portion of water saturated with sodium chloride each time, and then dried over anhydrous magnesium sulfate. After filtration and then evaporation there remained an oil which on distillation yielded 55.4 grams (77% yield) of 2-(2-dioxolanyl) - 3 - methyl - 7,7 - dimethoxy-5-norbornene, B.P. 100–103° C./0.5–0.6 mm.; $n_D^{25}$, 1.4821.

Calculated for $C_{13}H_{20}O_4$ (percent): C, 65.0; H, 8.4. Found (percent): C, 65.1; H, 8.3.

EXAMPLE 15

Employing procedures similar to those described in Example 14, the product of Example 7 was converted to 2-[2-(1,3-dioxanyl)]-3-methyl-7,7-dimethoxy - 5 - norbornene, B.P. 90–110° C./0.2–0.3 mm.; $n_D^{25}$, 1.4858. A yield of 93% was obtained.

Calculated for $C_{14}H_{22}O_4$ (percent): C, 66.1; H, 8.7. Found (percent): C, 66.1; H, 8.8.

EXAMPLE 16

Employing procedures similar to those described in Example 14, the product of Example 8 was converted to 2-[2-(4'-methoxymethyldioxolanyl)] - 3 - methyl-7,7-dimethoxy-5-norbornene, B.P. 117–37° C./0.1–0.2 mm.; $n_D^{25}$, 1.4773. A yield of 80% was obtained.

Calculated for $C_{15}H_{24}O_5$ (percent): C, 63.4; H, 8.5. Found (percent): C, 63.1; H, 8.4.

EXAMPLE 17

Employing procedures similar to those described in Example 14, the product of Example 9 was converted to 2-(2-dioxolanyl) - 7,7 - dimethoxy - 5 - norbornene, B.P. 88–102° C./0.1–0.3 mm.; $n_D^{25}$, 1.4832. A yield of 68% was obtained.

Calculated for $C_{12}H_{18}O_4$ (percent): C, 63.7; H, 8.0. Found (percent): C, 63.5; H, 7.9.

EXAMPLE 18

Employing procedures similar to those described in Example 14, the product of Example 10 was converted to 2-(2-dioxolanyl) - 2 - methyl - 7,7 - dimethoxy-5-norbornene, B.P. 88–98° C./0.1–0.2 mm.; $n_D^{25}$, 1.4846. A yield of 66% was obtained.

Calculated for $C_{13}H_{20}O_4$ (percent): C, 65.0; H, 8.4. Found (percent): C, 64.7; H, 8.4.

EXAMPLE 19

Employing procedures similar to those described in Example 14, the product of Example 11 was converted to 2 - methyl - 2 - (dimethoxymethyl) - 7,7 - dimethoxy-5-norbornene, B.P. 100° C./1 mm.; $n_D^{25}$, 1.4574.

Calculated for $C_{13}H_{22}O_4$ (percent): C, 64.5; H, 9.1. Found (percent): C, 64.6; H, 9.1.

EXAMPLE 20

Employing procedures similar to those described in Example 14, the product of Example 12 was converted to 2 - (2 - dioxolanyl) - 3 - methyl - 7,7 - ethylenedioxy-5-norbornene, B.P. 114–125° C./0.1 mm.; $n_D^{25}$, 1.5004.

Calculated for $C_{13}H_{18}O_4$ (percent): C, 65.5; H, 7.6. Found (percent): C, 65.4; H, 7.7.

EXAMPLE 21

Employing procedures similar to those described in Example 14, the product of Example 13 was converted to 2 - (2 - dioxolanyl) - 3 - methyl - 7,7 - dibutoxy - 5-norbornene, B.P. 92–102° C./0.2 mm.; $n_D^{25}$, 1.4852.

Calculated for $C_{19}H_{32}O_4$ (percent): C, 70.3; H, 9.9. Found (percent): C, 69.9; H, 9.9.

EXAMPLE 22

A mixture of 0.2 grams of platinum oxide and a solution of 24 grams of the 2-(2-dioxolanyl)-3-methyl-7,7-dimethoxy-5-norbornene produced as described in Example 14 in 125 milliliters of ethanol was subjected, with shaking, to a pressure of 60 pounds of hydrogen in a medium-pressure hydrogenation apparatus. After cessation of hydrogen up-take, the reaction mixture was filtered. The filtrate was evaporated on a steam bath and the residual liquor was distilled to yield 19.4 grams of 2-(2-dioxolanyl)-3-methyl-7,7-dimethoxynorbornane, B.P. 95–105° C./0.1–0.2 mm.; $n_D^{25}$, 1.4780.

Calculated for $C_{13}H_{22}O_4$ (percent): C, 64.4; H, 9.2. Found (percent): C, 64.7; H, 9.1.

Employing procedures similar to those described in Example 22 the 5-norbornene compounds of Examples 15, 16, 17, 18, 19, 20 and 21 can be converted to 2-[2-(1,3-dioxanyl)]-3-methyl-7,7-dimethoxynorbornane, 2-[2 - (4'-methoxymethyldioxolanyl)]-3-methyl-7,7 - dimethoxynorbornane, 2-(2-dioxolanyl)-7,7 - dimethoxynorbornane, 2-(2-dioxolanyl)-2-methyl - 7,7 - dimethoxynorbornane, 2-methyl-2-(dimethoxymethyl)-7,7 - dimethoxynorbornane, 2-(2-dioxolanyl)-3-methyl-7,7 - ethylenedioxynorbornane and 2-(2-dioxolanyl)-3-methyl-7,7 - dibutoxynorbornane, respectively.

Each of the compounds of Examples 14–20 and 22 was evaluated simultaneously for central nervous system depressant activity and toxicity by the following procedure:

An aqueous emulsion containing 100 milligrams of the compound to be tested and 1 drop of "Tween 80" (a non-ionic surfactant marketed by Atlas Powder Co.) per milliliter of emulsion was prepared. The emulsion was then administered intraperitoneally to each of 10 mice weighing 20 to 30 grams in an amount of 1,000 milligrams of the drug per kliogram of body weight. The test animals were then observed for the first 6 hours after treatment for central nervous system depressant effects and then at 24 and 48 hours for mortality. If all or most of the mice die, subsequent tests are carried out wherein the dosage is reduced by halves until a low dose of 125 mg./kg. is given. After 48 hours the median lethal dose is bracketed and approximated ($ALD_{50}$). For example, if all animals die at 1,000 mg./kg. and none die at 500 mg./kg., the $ALD_{50}$ is 750 mg./kg.

All the compounds tested were found to be Class IV depressants. That is, the animals exhibited reduced activity, ataxia, and loss of the righting reflex when placed upon their backs. The products of Examples 16, 17, 19 and 20 exhibited no toxic effects at a dosage of 1,000 mg./kg. and the product of Example 14 exhibited no toxic effects at a dosage of 500 mg./kg. The products of Examples 15, 18 and 22 had $ALD_{50}$ values of 750 mg./kg.

No toxic effects were observed when the test emulsions were administered orally to mice at a level of 2,000 mg./kg.

The compounds of Examples 14–20 and 22 are also evaluated for anti-convulstant activity by the following procedure:

Each of 10 male mice weighing 20–25 grams was treated orally with an aqueous emulsion of the compound to be evaluated and then, 10 minutes before the anticipated time of peak anticonvulsant activity, was treated subcutaneously with 85 milligrams of a 5% Metrazol solution per kilogram of animal body weight. The animals were observed for the next 60 minutes for the occurrence of seizures. Transient intermittent jerks or tremulousners were not considered as being convulsions. Absence of even a threshold convulsion (one episode of clonic spasms persisting for at least 5 seconds) was taken as the endpoint of the test. Various dosages were administered and the dosage which effectively prevented Metrazol-induced convulsions in 50 percent of the animals ($ED_{50}$) was estimated.

The results are summarized as follows:

| Example: | $ED_{50}$, mg./kg. |
|---|---|
| 14 [1] | <500 |
| 15 | 250 |
| 16 | [2] >300 |
| 17 | [2] >300 |
| 18 | 250 |
| 19 | <500 |
| 20 | [2] >200 |
| 22 | [2] >300 |

[1] In this test 95 mg./kg. of the Metrazol solution was administered.
[2] No anticonvulsant effects were observed at these dosages.

It is here noted that for purposes of classification four central nervous system depressant classes were established as follows:

Class 1=The activity of the test animals decreases.
Class 2=Class 1 plus ataxia (incoordinated muscular activity or staggering).
Class 3=Class 1 plus Class 2 plus delayed righting reflex (the ability of the animal to right itself when placed on its back).
Class 4=Class 1 plus Class 2 plus Class 3 plus loss of righting reflex.

The invention has been described in detail with particular reference to preferred embodiments thereof, but it will be understood that variations and modifications can be effected within the spirit and scope of the invention as described hereinbefore and as defined in the appended claims.

I claim:
1. A compound having the formula:

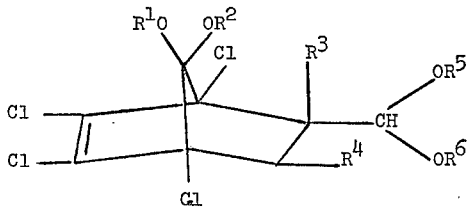

wherein each of $R^1$, $R^2$, $R^5$ and $R^6$ individually represents lower alkyl, each of $R^3$ and $R^4$ represents hydrogen or lower alkyl, wherein $R^1$ and $R^2$ when taken collectively represent unsubstituted polymethylene having two to four carbon atoms, wherein $R^5$ and $R^6$ when taken collectively represent unsubstituted polymethylene having two to four carbon atoms.

2. A compound in accordance with claim 1 wherein $R^1$ and $R^2$ when taken individually represent the same lower alkyl and when taken collectively represent unsubstituted polymethylene having 2 to 4 carbon atoms and wherein $R^5$ and $R^6$ when taken individually represent the same lower alkyl and when taken collectively represent unsubstituted polymethylene having 2 to 4 carbon atoms.

3. A compound in accordance with claim 1 wherein each of $R^1$ and $R^2$ is methyl.

4. A compound in accordance with claim 1 wherein $R^5$ and $R^6$ are taken collectively and represent unsubstituted polymethylene having 2 to 4 carbon atoms.

References Cited
UNITED STATES PATENTS

| | | | |
|---|---|---|---|
| 3,436,404 | 4/1969 | Chang | 260—340.9 X |
| 3,496,228 | 2/1970 | Hoover | 260—340.9 X |

ALEX MAZEL, Primary Examiner

J. H. TURNIPSEED, Assistant Examiner

U.S. Cl. X.R.

260—338, 340.7, 611 R; 424—278